United States Patent
Hwang et al.

(10) Patent No.: US 9,620,112 B2
(45) Date of Patent: Apr. 11, 2017

(54) SYNTAX PARSING APPARATUS BASED ON SYNTAX PREPROCESSING AND METHOD THEREOF

(71) Applicant: SK PLANET CO., LTD., Seongnam-si, Gyeonggi-do (KR)

(72) Inventors: Young Sook Hwang, Seoul (KR); Chang Hao Yin, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 14/399,765

(22) PCT Filed: Aug. 30, 2013

(86) PCT No.: PCT/KR2013/007845
§ 371 (c)(1),
(2) Date: Nov. 7, 2014

(87) PCT Pub. No.: WO2014/069779
PCT Pub. Date: May 8, 2014

(65) Prior Publication Data
US 2015/0142443 A1    May 21, 2015

(30) Foreign Application Priority Data
Oct. 31, 2012  (KR) .................. 10-2012-0122372

(51) Int. Cl.
*G10L 15/00* (2013.01)
*G10L 15/19* (2013.01)
(Continued)

(52) U.S. Cl.
CPC .............. *G10L 15/19* (2013.01); *G06F 17/27* (2013.01); *G06F 17/271* (2013.01); *G10L 15/14* (2013.01)

(58) Field of Classification Search
CPC .. G06F 17/278; G06F 17/2818; G06F 17/271; G06F 17/274; G06F 17/2755; G06F 17/2785; G10L 13/08; G10L 15/1815
(Continued)

(56) References Cited

U.S. PATENT DOCUMENTS 5,842,159 A * 11/1998 Nakamura .......... G06F 17/2863
                                                                704/10
6,243,669 B1 * 6/2001 Horiguchi ............. G06F 17/271
                                                                704/257
(Continued)

FOREIGN PATENT DOCUMENTS

KR    1019980078534 A    11/1998
KR    1020060064443 A    6/2006
(Continued)

OTHER PUBLICATIONS

International Search Report for PCT/KR2013/007845 dated Nov. 7, 2013.

*Primary Examiner* — Michael Colucci
(74) *Attorney, Agent, or Firm* — Hauptman Ham, LLP

(57) ABSTRACT

The present disclosure relates to a syntax parsing apparatus based on syntax preprocessing and a method thereof. In specific, the present disclosure parses syntaxes that can be parsed by rules and patterns without ambiguity by syntax parsing preprocessing, draws all possible syntax parsing results by applying syntax rules based on a result of syntax parsing preprocessing in which ambiguity is partially resolved, and resolves structural ambiguity by applying a statistic syntax parsing model learned from a syntax tree attachment learning corpus so as to reduce ambiguity in rule-based syntax parsing and to resolve ambiguity by a statistics-based scheme so that parsing correctness and processing efficiency in a syntax parsing method can be enhanced.

16 Claims, 6 Drawing Sheets

(51) Int. Cl.
*G06F 17/27* (2006.01)
*G10L 15/14* (2006.01)

(58) Field of Classification Search
USPC ... 704/257, 235, 277, 3, 4, 9; 707/736, 737; 715/234; 73/628
See application file for complete search history.

(56) References Cited

U.S. PATENT DOCUMENTS

| | | | | |
|---|---|---|---|---|
| 6,266,642 | B1* | 7/2001 | Franz | G06F 17/271 704/257 |
| 6,282,507 | B1* | 8/2001 | Horiguchi | G06F 17/271 345/171 |
| 6,442,524 | B1* | 8/2002 | Ecker | G06F 17/2755 704/257 |
| 7,085,716 | B1* | 8/2006 | Even | G10L 15/22 704/235 |
| 7,346,487 | B2* | 3/2008 | Li | G06F 17/2735 704/10 |
| 7,395,256 | B2* | 7/2008 | Ji | G06F 17/3071 707/737 |
| 7,783,474 | B2* | 8/2010 | Cote | G10L 13/08 704/10 |
| 9,122,674 | B1* | 9/2015 | Wong | G06F 17/28 |
| 9,280,520 | B2* | 3/2016 | Guenigault | G06F 17/21 |
| 2003/0083861 | A1* | 5/2003 | Weise | G06F 17/271 704/9 |
| 2004/0176945 | A1* | 9/2004 | Inagaki | G06F 17/2715 704/4 |
| 2005/0022114 | A1* | 1/2005 | Shanahan | G06F 21/10 715/234 |
| 2005/0038643 | A1* | 2/2005 | Koehn | G06F 17/2818 704/2 |
| 2006/0200338 | A1* | 9/2006 | Cipollone | G06F 17/2735 704/4 |
| 2007/0038437 | A1* | 2/2007 | Brun | G06F 17/278 704/9 |
| 2007/0056374 | A1* | 3/2007 | Andrews | G01N 29/4418 73/628 |
| 2009/0193011 | A1* | 7/2009 | Blair-Goldensohn | G06F 17/30719 |
| 2010/0030552 | A1* | 2/2010 | Chen | G06F 17/30734 704/9 |
| 2012/0036130 | A1* | 2/2012 | Light | G06F 17/2785 707/736 |
| 2012/0290288 | A1* | 11/2012 | Ait-Mokhtar | G06F 17/271 704/9 |
| 2013/0096911 | A1* | 4/2013 | Beaufort | G06F 17/273 704/9 |

FOREIGN PATENT DOCUMENTS

| | | |
|---|---|---|
| KR | 1020080024638 A | 3/2008 |
| KR | 101180589 B1 | 9/2012 |
| WO | 2012030053 A2 | 3/2012 |

* cited by examiner

(1) SYNTAX PATTERN RULE DESCRIPTION PRINCIPLE
%section SECTION_NAME
%define NAME any string
%rule/RULE_NAME* pattern -> action (2) AN EXAMPLE OF SYNTAX PATTERN DICTIONARY
%section ENG_QP %subcat CUR_FRNT '$' '¢' '€' '$' '£'
%define CRNCY_MAP $=dollar; ¢=cent;€=eur; $=dollar; £=pound;¥=yen;dollar=dollar
%rule* @CUR_FRNT @@digit | @@digits @UNIT | @UNITS + 0 + 2 +
MONEY/[type:money,ctype:QP,ctag:CD,has_mw:true,tag:NCM]( $1/[base:~tr/base/#CRNCY_MAP#]/2
* NUS/[type:card,ctype:CD,ctag:CD]/1(#2/1 $3/2*))

%section ENG_QP
%define NPUNC ^',' | ^'.' | ^':' | ^';' | ^'--'
%define NFS ^'.' | ^':' | ^';'
%define NOUN &more | &@DOLLAR | &@PERCENT/DT | POS | CD | NN | NNS | NNP | NNPS | PRP
// more than CD NNS ago %rule+ more | less | "fewer" than ^the/DT | CD | JJ NN | NNS | NNP | NNPS ago | later ->
NP/[ctag:NP,ctype:orange]( $1 $2 $3 $4 ) $5
// , according to ... .
%rule+, "according" #NPUNC# +1+ + . -> $1 VP/[ctag:VP,ctype:range]( $2* $3) $4

202

SYNTAX PARSING APPARATUS BASED ON SYNTAX PREPROCESSING AND METHOD THEREOF

TECHNICAL FIELD

Embodiments of the present disclosure relate to a syntax parsing apparatus based on syntax preprocessing and a method thereof. In specific, the present disclosure relates to a syntax parsing apparatus based on syntax preprocessing and a method thereof that can enhance parsing correctness and processing efficiency in a syntax parsing process by reducing ambiguity in rule-based syntax parsing and resolving ambiguity by a statistics-based scheme.

BACKGROUND ART

Syntax parsing refers to a technique of determining a syntactical structure by parsing a given sentence according to a defined grammar structure. The syntax parsing method performs a parsing step by a syntax unit after morpheme parsing and tagging is finished. The syntax parsing method is largely divided into a rule-based parsing method and a statistics-based syntax parsing method.

The rule-based syntax parsing method parses a sentence by repetitively applying a relatively small number of rules. Accordingly, the rule-based syntax parsing method has a problem in that ambiguity processing is limited and parsing complexity increases due to an increase of ambiguity. Meanwhile, the statistics-based syntax parsing method can solve ambiguity by statistically modeling and applying correlation between vocabulary and a combination relation between syntaxes.

However, when applying a general statistics-based syntax parsing method, correctness in resolving ambiguity may be decreased due to a lack of learning data for extracting statistical information. Further, applying a general statistics-based syntax parsing method may have a problem in processing efficiency, for example, parsing speed decreases due to search of a massive statistic parameter space. Further, resolving ambiguity using statistic data has a problem in that it is not easy to add new knowledge or to enable a person to manage and tuning syntax parsing knowledge.

Therefore, a syntax parsing method that can reduce ambiguity likely generated when syntax parsing as much as possible is desperately needed. That is, a syntax parsing method that can reduce complexity of syntax parsing and that can effectively resolve ambiguity of syntax parsing is needed.

DETAILED DESCRIPTION OF THE INVENTION

Technical Problem

Embodiments of the present disclosure are to provide a syntax parsing apparatus based on syntax pre-processing and a method thereof that can enhance parsing correctness and process efficiency in a syntax parsing process by reducing ambiguity in rule-based syntax parsing and resolving ambiguity by statistics-based scheme.

In order to achieve this, embodiments of the present disclosure provide a syntax parsing apparatus based on syntax pre-processing and a method thereof that can parse syntaxes that can be parsed by rules and patterns without ambiguity by syntax parsing preprocessing, draw all possible syntax parsing results by applying syntax rules based on a result of syntax parsing preprocessing in which ambiguity is partially resolved, and resolve structural ambiguity by applying a statistic syntax parsing model learned from a syntax tree attachment learning corpus.

Further, embodiments of the present disclosure are to provide a syntax parsing apparatus based on syntax preprocessing and a method thereof that can reduce ambiguity by restraining a rule so that combination can be performed only between appropriate syntaxes using a feature-based syntax rule.

Technical Solution

A first aspect of the present disclosure is to provide a syntax parsing apparatus based on preprocessing including a pattern chunk recognition unit configured to recognize a pre-defined syntax pattern from an input result of part-of-speech tagging and generate at least one of a syntax tree, a section chunk, and a head-dependent relation chunk according to a syntax pattern type; a basic noun phrase recognizing unit configured to receive basic noun phrase (BNP) attachment corpuses as input to process the basic noun phrase attachment corpus into intermediate learning corpuses, generate a basic noun phrase statistical model from the processed intermediate learning corpuses, and recognize a basic noun phrase (BNP) from an input sentence using a result of part-of-speech tagging and the generated basic noun phrase statistical model; and a syntax parsing unit configured to parse a syntax using at least one recognition result among the syntax tree, the section chunk, the head-dependent relation chunk, a compound noun/compound word, and a name entity which are recognized and generate a syntax tree based on a result of the syntax parsing.

A second aspect of the present disclosure is to provide a syntax parsing method based on syntax pre-processing including a pattern chunk recognition step of recognizing a pre-defined syntax pattern from an input result of part-of-speech tagging and generating at least one of a syntax tree, a section chunk, and a head-dependent relation chunk according to a syntax pattern type; a basic noun phrase statistical model generation step of receiving basic noun phrase (BNP) attachment corpuses as input to process the basic noun phrase attachment corpus into intermediate learning corpuses and generating a basic noun phrase statistical model from the processed intermediate learning corpuses; a basic noun phrase recognition step of recognizing a basic noun phrase (BNP) from an input sentence using a result of part-of-speech tagging and the generated basic noun phrase statistical model; and a syntax parsing step of parsing a syntax using at least one recognition result among the syntax tree, the section chunk, the head-dependent relation chunk, a basic noun phrase, a compound noun/compound word, and a name entity which are recognized and generating a syntax tree based on a result of the syntax parsing.

A third aspect of the present disclosure is to provide a syntax parsing process including a pattern chunk recognition process of recognizing a pre-defined syntax pattern from an input result of part-of-speech tagging and generating at least one of a syntax tree, a section chunk, and a head-dependent relation chunk according to a syntax pattern type; a basic noun phrase statistical model generation process of receiving basic noun phrase (BNP) attachment corpuses as input to process the basic noun phrase attachment corpus into intermediate learning corpuses and generating a basic noun phrase statistical model from the processed intermediate learning corpuses; a basic noun phrase recognition process of recognizing a basic noun phrase (BNP) from an input sentence using a result of part-of-speech tagging and the generated basic noun phrase statistical model; and a syntax parsing process of parsing a syntax using at least one recognition result among the syntax tree, the section chunk, the head-dependent relation chunk, a basic noun phrase, a compound noun/compound word, and a name entity which are recognized and generating a syntax tree based on a result of the syntax parsing.

Advantageous Effects

Embodiments of the present disclosure have an effect of reducing complexity of syntax parsing and increasing correctness of syntax parsing and parsing speed by parsing syntaxes that can be parsed by rules and patterns correctly without ambiguity by syntax parsing preprocessing and drawing all possible syntax parsing results by applying syntax rules based on a result of syntax parsing preprocessing in which ambiguity is partially resolved.

Further, embodiments of the present disclosure construct syntax patterns to be recognized by a rule description principle by recognizing all syntax patterns that can be expressed by regular grammar, context free grammar, Augmented Context Free Grammar (Augmented CFG), and Context Sensitive Grammar (CSG) by an automata-based chunk pattern recognizing unit so as to utilize the syntax patterns in various aspects when increasing efficiency of syntax parsing or developing a system applying syntax parsing. That is, embodiments of the present disclosure express configurations including a series of words or part-of-speech listing patterns with regular grammar, express patterns that can be calculated using feature values of syntax nodes with context free grammar or augmented context free grammar, and express syntax patterns together with left and right context of a syntax tree with context sensitive grammar so as to have an effect of enhancing performance of a system for detecting partial grammar error and composition assistance system.

Further, embodiments of the present invention use results of various syntax parsing pre-processing including a result of compound noun recognition, a result of name entity recognition, and a result of basic noun phrase recognition in a syntax parsing process and are independently applied to a language so as to have an effect of easily performing syntax parsing with respect to any language if only a grammar dictionary, a syntax feature dictionary, and a statistic model for syntax ambiguity resolving, of a language to be parsed are given.

Further, embodiments of the present disclosure use results of 1-best path part-of-speech tagging and n-best part-of-speech tagging to have an effect of enhancing correctness of syntax parsing and minimizing a syntax parsing error caused by error propagation in a part-of-speech tagging step.

Further, embodiments of the present disclosure use a statistical model in which a syntax structure and a sentence component structure of an intuitive sentence are reflected to have an effect of relaxing a data deficiency problem by appropriately utilizing parts of speech and vocabulary and effectively resolving syntax ambiguity.

BRIEF DESCRIPTION OF THE DRAWINGS

FIG. 2 is a diagram illustrating an example of a structure of a syntax pattern rule and a syntax pattern dictionary according to an embodiment of the present disclosure;

MODE FOR CARRYING OUT THE INVENTION

Hereinafter, with reference to the accompanying drawings, embodiments of the present disclosure are described in detail. The configurations of the present disclosure and the effects thereof may be clearly understood by the detailed description described below. It should be understood that like numbers refer to like elements throughout and a detailed description of known configurations incorporated herein will be omitted when it may make the subject matter of the present disclosure rather unclear.

Figure 1:
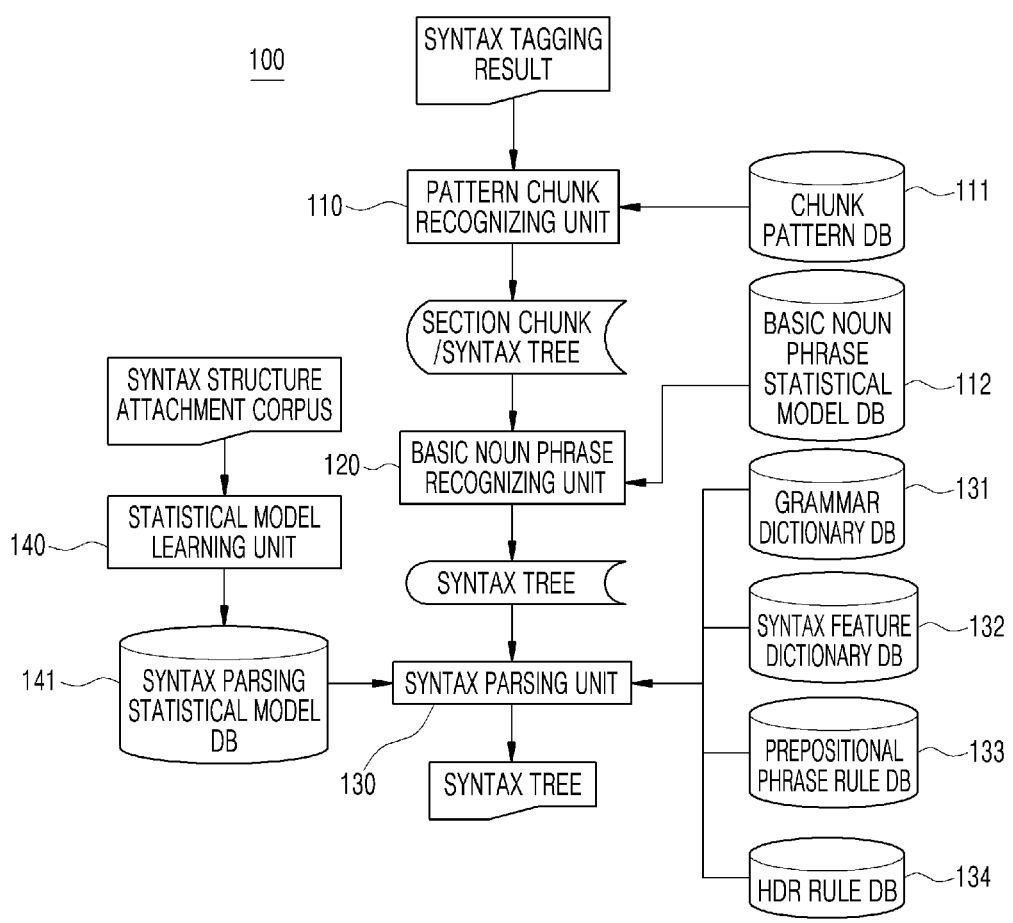
FIG. 1 is a diagram illustrating a configuration of a syntax parsing apparatus based on syntax preprocessing according to an embodiment of the present disclosure.

FIG. 1 is a diagram illustrating a configuration of a syntax parsing apparatus based on syntax preprocessing according to an embodiment of the present disclosure.

As illustrated in FIG. 1, a syntax parsing apparatus 100 includes a pattern chunk recognizing unit 110, a basic noun phrase recognizing unit 120, a syntax parsing unit 130, and a statistical model learning unit 140. Here, the chunk pattern recognizing unit 110 is connected to a chunk pattern DB 111 storing a quantifier chunk, an HDR chunk, and other chunk patterns. Further, the basic noun phrase recognizing unit 120 is connected to a basic noun phrase statistical model DB 112. Further, the syntax parsing unit 130 is connected to a grammar dictionary DB 131, a syntax feature dictionary DB 132, a prepositional phrase rule DB 133, and an HDR rule DB 134.

Hereinafter, respective components of the syntax parsing apparatus 100 according to an embodiment of the present disclosure are described. The pattern chunk recognizing unit 110 is described in detail with reference to FIGS. 2 to 4. Further, the basic noun phrase recognizing unit 120 is described in detail with reference to FIG. 5. Further, the syntax parsing unit 130 is described in detail with reference to FIG. 6.

The pattern chunk recognizing unit (Shallow Parser) 110 receives a part-of-speech tagged sentence as input, recognizes a pre-defined syntax pattern, and outputs a syntax tree or a result in a predetermined form. The pattern chunk recognizing unit 110 is used to recognize a series of words/part-of-speech sequence in which a generation pattern is basically clear. The pattern chunk recognizing unit 110 generates at least one of a syntax tree, a section chunk, and a head-dependent relation chunk according to a type of a syntax pattern after recognition of the syntax pattern. The pattern chunk recognizing unit 110 recognizes a quantifier pattern including a numeral and a quantifier, and generates a syntax tree as a result thereof. Further the pattern chunk recognizing unit 110 recognizes clause separation, a parallel phrase, and other patterns, and generates a section chunk and a head-dependent relation chunk as a result thereof.

The pattern chunk recognizing unit 110 may recognize various syntax patterns. For example, the pattern chunk recognizing unit 110 may recognize syntax patterns that can be expressed by regular grammar, context free grammar, Augmented Context Free Grammar (Augmented CFG), and Context Sensitive Grammar (CSG). That is, the pattern chunk recognizing unit 110 may express syntax patterns including a series of words and a part-of-speech listing pattern using regular grammar and may convert the syntax patterns into a syntax parse tree. Further, the pattern chunk recognizing unit 110 may express patterns that can be calculated with a node feature value using a Context Free Grammar (CFG) or Augmented Context Free Grammar (Augmented CFG). Further, the pattern chunk recognizing unit 110 may express a syntax pattern with left and right contexts using a context sensitive grammar format.

The basic noun phrase recognizing unit 120 receives basic noun phrase (BNP) attachment corpuses as input, processes the basic noun phrase attachment corpuses into intermediate learning corpuses, generates a basic noun phrase statistical model from the processed intermediate learning corpuses, and recognizes basic noun phrases (BNP) from the input sentence using the result of part-of-speech tagging and the generated basic noun phrase statistical model.

The syntax parsing unit 130 parses a syntax using at least one recognition result of a syntax tree, a section chunk, a head-dependent relation chunk, a basic noun phrase, a compound noun/compound word, and a name entity recognized by the pattern chunk recognizing unit 110 and the basic noun phrase recognizing unit 120, and generates a syntax tree based on a result of syntax parsing.

The statistical model learning unit 140 learns a statistical model from a syntax structure attachment corpus, and stores a result of learning in a syntax parsing statistical model DB 141.

FIG. 2 is a diagram illustrating an example of a structure of a syntax pattern rule and a syntax pattern dictionary according to an embodiment of the present disclosure.

As illustrated in FIG. 2, the pattern chunk recognizing unit 110 recognizes syntax patterns and describes a syntax pattern according to a syntax rule writing principle 201. The rule 201 includes a section (Section) configured for division according to a syntax pattern/syntax chunk type, a definition (Define) statement configured to simplify and express a complicated node, a virtual tag (vtag) configured to parameterize some tags, a subcategory (Subcat) configured to define a vocabulary category, a rule (rule) including patterns and actions, and the like. The pattern chunk recognizing unit 110 divides syntax patterns or syntax chunks into sections according to types to describe. At this point, all a definition statement and a rule described in a workspace after one section is declared until another section is declared becomes a syntax pattern or a section chunk of the same type.

Figure 3:
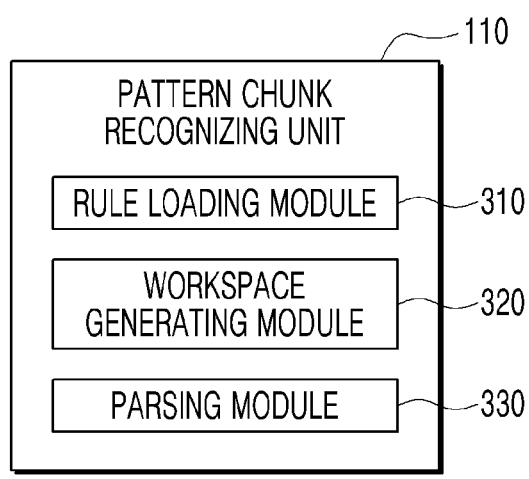
FIG. 3 is a diagram illustrating a detailed configuration of a pattern chunk recognizing unit of FIG. 1 according to an embodiment of the present disclosure.

FIG. 3 is a diagram illustrating a detailed configuration of a pattern chunk recognizing unit of FIG. 1 according to an embodiment of the present disclosure.

The pattern chunk recognizing unit 110 recognizes syntax pattern rules by using a Bottom-up Chart Parsing algorithm. The pattern chunk recognizing unit 110 scans an input data sentence from the right to the left, finds all rules that are applicable to one position, and applies the rules so as to recognize a syntax pattern. Further, the pattern chunk recognizing unit 110 generates a syntax tree or a section chunk according to a syntax pattern type.

As illustrated in FIG. 3, the pattern chunk recognizing unit 110 includes a rule loading module 310 configured to read a syntax pattern dictionary and store into a storage structure in a system, a workspace generating module 320 configured to create a workspace, and a parsing module 330 configured to apply a syntax pattern dictionary to actual input data to parse. Hereinafter, each module is described as follows.

First, the rule loading module 310 opens a syntax pattern dictionary file, reads the syntax pattern dictionary file by one line, and stores the syntax pattern dictionary file in a storage structure appropriate for a rule. That is, when the rule loading module 310 meets a section syntax, the rule loading module 310 recognizes the section syntax, and stores the section syntax in a storage structure appropriate for the section syntax. Until a new section is declared, the rule loading module 310 performs processing with a common section. Further, the rule loading module 310 stores a definition statement and a virtual tag statement in a definition table (Define Table) and a virtual tag table (vtag table). Further, the rule loading module 310 stores subcategory (subcat) information in a trie structure. This is performed to enhance search efficiency. The rule loading module 310 divides a rule into a pattern and an action to parse and stores the rule in a rule table.

The workspace generating module 320 generates a workspace configured for next parsing. The workspace includes an agenda (agenda) which is a set of active charts (achart) including rules in which pattern matching is in progress, an inactive agenda (igenda) which is a set of inactive charts (inactive chart) including already complete node information, and a parse tree configured to store a set of terminal nodes, a set of non-terminal nodes, and results of parsing. The workspace generating module 320 creates a structure and a storage space of such workspace components.

Further, the parsing module 330 performs an actual syntax pattern recognition algorithm. The syntax pattern recognition algorithm uses a bottom-up parsing algorithm as illustrated in FIG. 4 described below.

Figure 4:
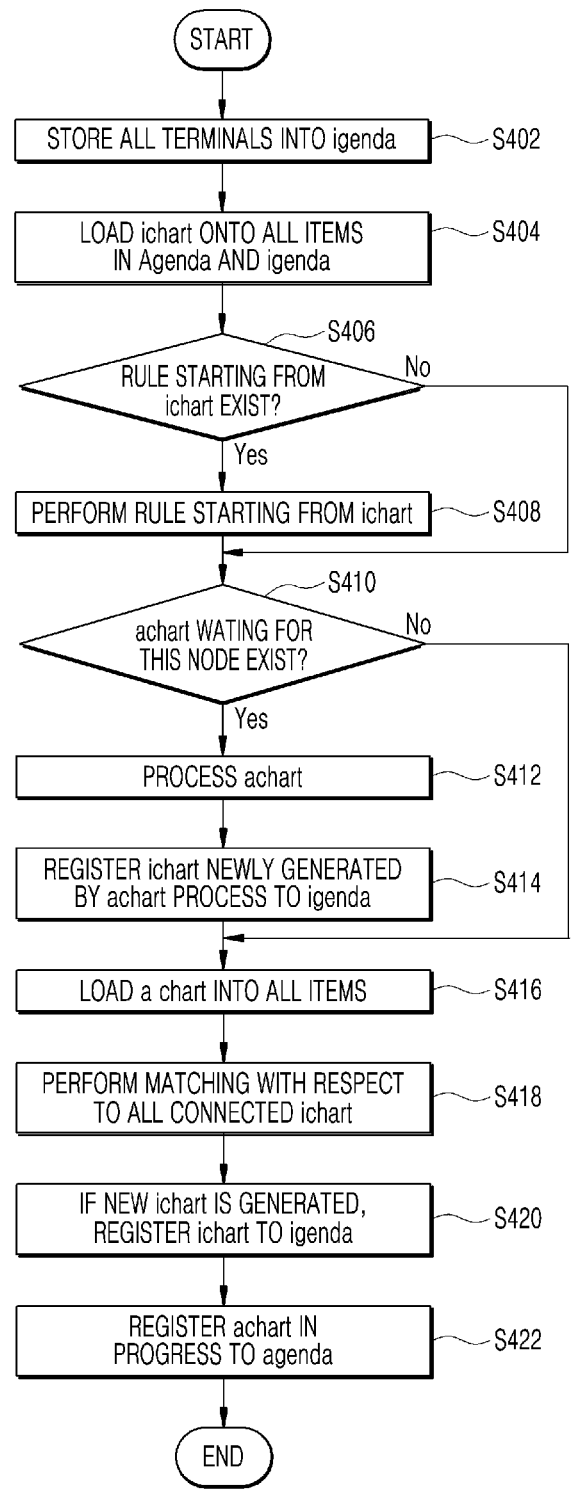
FIG. 4 is a flowchart illustrating a bottom-up parsing algorithm according to an embodiment of the present disclosure.

FIG. 4 is a flowchart illustrating a bottom-up parsing algorithm according to an embodiment of the present disclosure.

The parsing module 330 performs a syntax pattern recognition algorithm as illustrated in FIG. 4 for rule matching. In the case of active charts (achart) in progress or active charts (achart) newly started in a rule, each active chart (achart) has source trees that express syntax patterns. The parsing module 330 uses source trees and compares existing trees or nodes (ichart) with lexicons (lex), part-of-speech or syntax tag (tag), a syntax feature, and child nodes of the nodes.

When the comparison result is identical, the parsing module 330 performs separate operations according to whether the rule is complete or incomplete. That is, in the case of a complete rule, the parsing module 330 uses tree generation information, called a target, in the rule and generates a new inactive chart (ichart). Meanwhile, in the case of an incomplete rule, the parsing module 330 generates an active chart (achart) in which an index indicating an identical position in a syntax pattern is increased by one. Hereinafter, with reference to FIG. 4, a bottom-up parsing algorithm is described in detail.

The parsing module 330 stores all terminals in an inactive agenda (igenda) in step S402.

The parsing module 330 loads inactive charts (ichart) with respect to all items in an agenda (Agenda) and the inactive agenda (igenda) in step S404.

The parsing module 330 checks whether there is a rule starting at the inactive charts (ichart) in step S406.

After the check in step S406, if there is a rule starting at the inactive charts (ichart), the parsing module 330 performs a rule starting at the inactive charts (ichart) in step S408.

Further, the inactive charts (ichart) checks whether there is an active chart (achart) waiting for the node in step S410.

After the check in step S410, if there is an active chart (achart) waiting for the node, the parsing module 330 progresses to the active chart (achart) in step S412.

After the progress to the active chart (achart) in step S412, the parsing module 330 registers a newly generated inactive chart (ichart) to the inactive agenda (igenda) in step S414.

Meanwhile, the parsing module 330 loads the active chart (achart) with respect to all items in step S416.

Further, the parsing module 330 performs rule matching with respect to all inactive charts (ichart) connected to the active chart (achart) in step S418.

Subsequently, when a new inactive chart (ichart) is generated, the parsing module 330 registers the newly created inactive chart (ichart) to the inactive agenda (igenda) in step S420.

Thereafter, the parsing module 330 registers an active chart (achart) continuously in progress to the agenda (agenda) in step S422.

Figure 5:
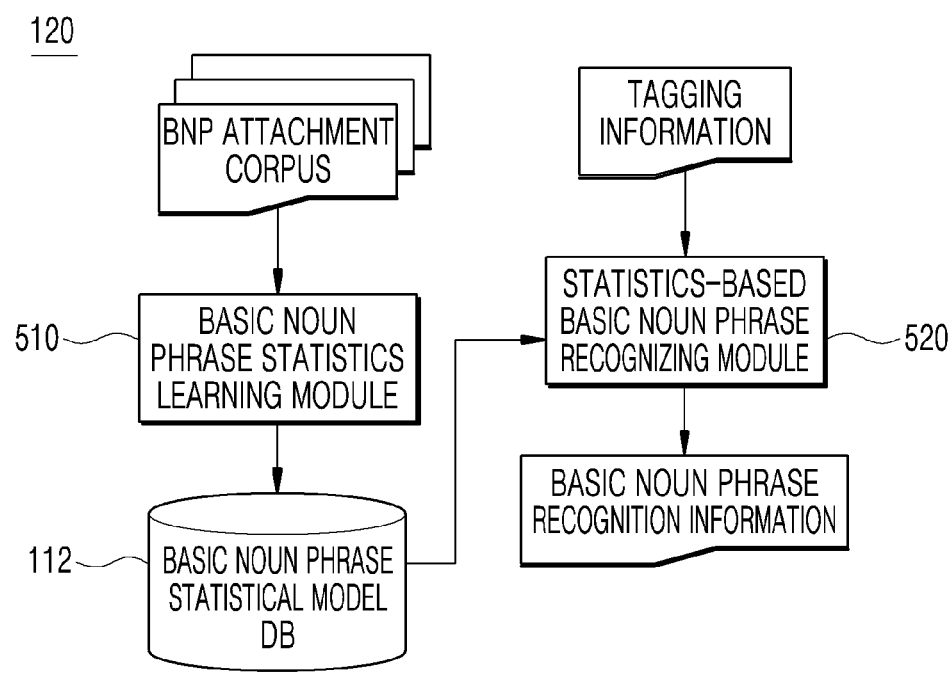
FIG. 5 is a diagram illustrating a detailed configuration of a basic noun phrase recognizing unit of FIG. 1 according to an embodiment of the present disclosure.

FIG. 5 is a diagram illustrating a detailed configuration of a basic noun phrase recognizing unit of FIG. 1 according to an embodiment of the present disclosure.

The basic noun phrase recognizing unit 120 receives a result of sentence tagging as input and outputs a result of basic noun phrase recognition. Here, the basic noun phrase (BNP) refers to a noun phrase which is the most basic phrase among various phrases that configure a sentence. In order to enhance the performance of syntax parsing in which a process amount is large but accuracy is poor, the basic noun phrase recognizing unit 120 applies a basic noun phrase recognition method that presents high accuracy and stable performance. This is to reduce complexity of the syntax parsing and enhance the accuracy.

For this, the basic noun phrase recognizing unit 120 according to an embodiment of the present disclosure includes a basic noun phrase statistics learning module 510 configured to receive basic noun phrase (BNP) attachment corpuses to learn a BNP statistical model and a statistics-based basic noun phrase recognizing module 520. The basic noun phrase statistics learning module 510 and the statistics-based basic noun phrase recognizing module 520 are connected to the basic noun phrase statistical model DB 112.

The basic noun phrase statistics learning module 510 builds a learning corpus processed in a form in which only a basic noun phrase is tagged based on grammar defined by Penn TreeBank for basic noun phrase recognition. Further, the basic noun phrase statistics learning module 510 uses a Finite State Transducer (FST) and processes an initial corpus into a form in which the initial corpus can be used in a system. The basic noun phrase statistics learning module 510 classifies the input corpuses with an open parenthesis, a closed parenthesis, and a word and actions for the input are defined and processed. Subsequently, the basic noun phrase statistics learning module 510 extracts features to be used for basic noun phrase recognition from the processed corpuses (hereinafter, intermediate learning corpuses). The feature selection is to select meaningful features using information gain, to test various features, and to extract features with minimum errors.

After selecting features to be used, the basic noun phrase statistics learning module 510 extracts features from the intermediate learning corpuses, and converts the features into a form for learning the features by a Conditional Random Field (CRF) algorithm in a form to progress to learning.

When learning progress ends, the basic noun phrase statistics learning module 510 generates a basic noun phrase statistical model and stores the basic noun phrase statistical model DB 112. Further, the basic noun phrase statistical model stores in a form of ASCII codes. In addition, the basic noun phrase statistical model may be applied to all circumstances regardless of the circumstance in which the learning is performed.

Further, the statistics-based basic noun phrase recognizing module 520 receives a result of tagging and a result of basic noun phrase statistical model learning as input. In addition, the statistics-based basic noun phrase recognizing module 520 uses the result of tagging and the result of basic noun phrase statistical model learning, recognizes a basic noun phrase (BNP) from an input sentence, and outputs basic noun phrase recognition information.

Figure 6:
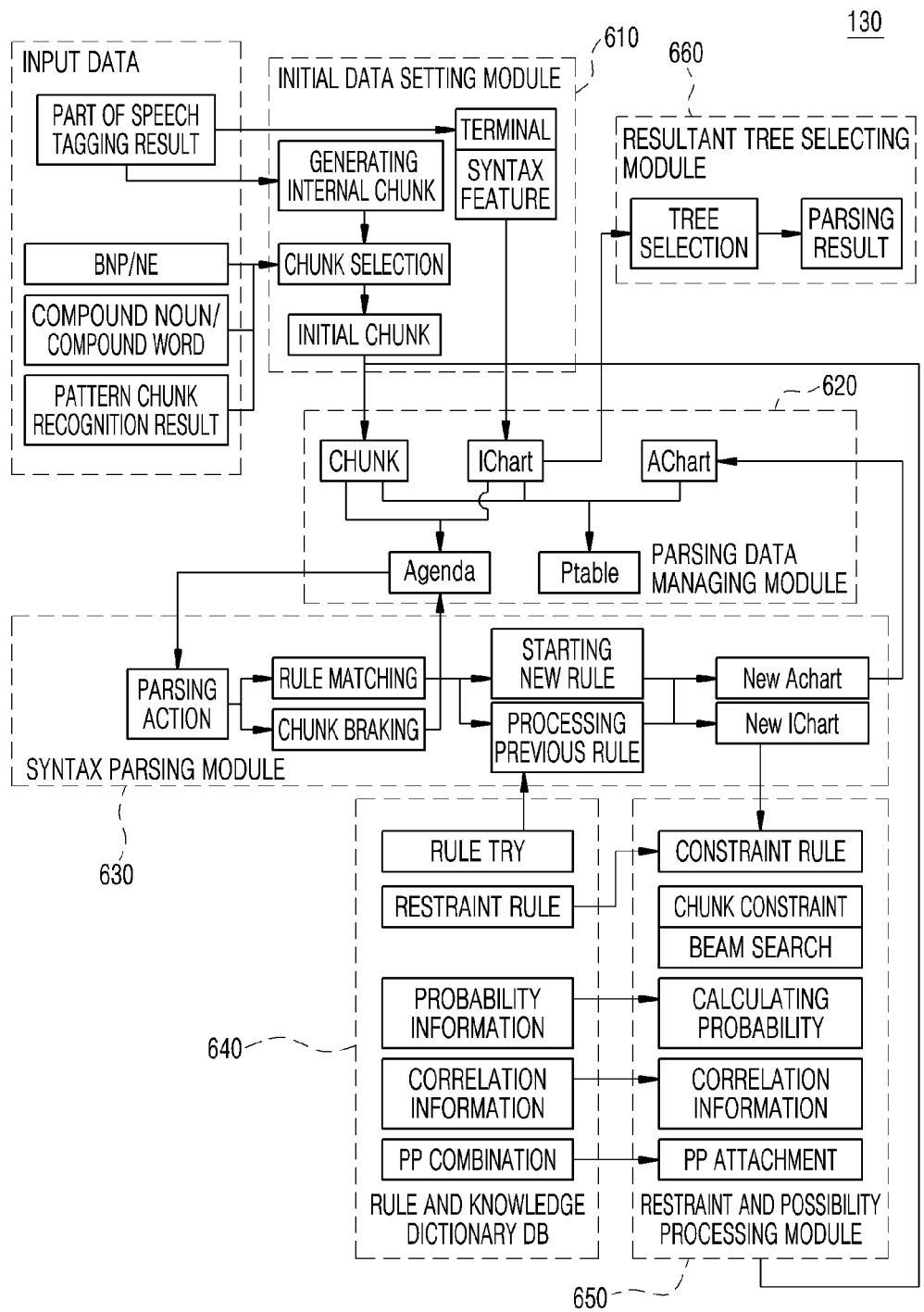
FIG. 6 is a diagram illustrating a detailed configuration of a syntax parsing unit in FIG. 1 according to an embodiment of the present disclosure.

FIG. 6 is a diagram illustrating a detailed configuration of a syntax parsing unit in FIG. 1 according to an embodiment of the present disclosure.

The syntax parsing unit 130 parses a syntax relation between morphemes included in a sentence and determines a structure of the sentence. In order to achieve this, the syntax parsing unit 130 receives a result of part-of-speech tagging and various chunking results (for example, a compound noun/compound word, a syntax tree/section chunk, a basic noun phrase (BNP), and a Name Entity (NE) recognition result) as input, and uses syntax parsing grammar and various kinds of dictionary information to parse the structure of the sentence. Thereafter, the syntax parsing unit 130 generates a parse tree based on the result of parsing the structure of the sentence. In general, when the structure of the sentence is parsed, the lexical feature of the natural language and syntax parsing grammar generates structural ambiguity. Meanwhile, the syntax parsing unit 130 according to an embodiment of the present disclosure may use various kinds of possibility information extracted from the corpus, resolve the ambiguity, and select optimum syntax structure.

Hereinafter, respective components of the syntax parsing unit 130 according to an embodiment of the present disclosure are described.

As illustrated in FIG. 6, the syntax parsing unit 130 includes an initial data setting module 610, a parsing data managing module 620, a syntax parsing module 630, a rule and knowledge dictionary DB 640, a restraint and possibility processing module 650, and a resultant tree selecting module 660. The rule and knowledge dictionary DB 640 may include the grammar dictionary DB 131, the syntax feature dictionary DB 132, the prepositional phrase rule DB 133, and the HDR rule DB 134 of FIG. 1.

The syntax parsing unit 130 receives a result of part-of-speech tagging and a result of chunking as input data to perform syntax parsing.

In specific, the initial data setting module 610 uses two kinds of results of parsing based on a path and a state, as results of part-of-speech tagging with respect to an input sentence. The results of part-of-speech tagging may include sub-word information with respect to each vocabulary. The initial data setting module 610 determines whether to use 1-best path part-of-speech only or to use an n-best tag according to an option of the result of part-of-speech tagging. Here, the option refers to a process level.

Here, the 1-best path is always used as a result of part-of-speech tagging with the highest credibility. When the 1-best path is used only, a correct tree may not be generated due to an erroneously attached part-of-speech tag. In order to solve the problem, an n-best tag may be used together as auxiliary means. At this point, when all n-best tags are used, more intermediate nodes are generated than a predetermined number of nodes to decrease performance in a process of syntax parsing. In order to solve the problem, a score of a part of speech shown in the n-best path is compared with a score of the part of speech shown in the 1-best path so that only parts of speech having scores higher than a threshold value are used.

Together with the result of part-of-speech tagging described above, the initial data setting module 610 uses chunking results which are results of the chunk pattern recognizing unit 110 and the basic noun phrase recognizing unit 120. Here, an outside chunking result is generated basically by using a 1-best path part of speech only. The outside chunking result includes starting/end morpheme information, head information, and additional information of a chunk.

The initial data setting module 610 may use a result of compound noun/compound word recognition and a result of name entity (NE) recognition in addition to outside chunking results of the chunk pattern recognizing unit 110 and the basic noun phrase recognizing unit 120.

Meanwhile, a syntax parsing algorithm using a result of n-best part-of-speech tagging and a result of chunking follows a general bottom-up chart parsing algorithm. At this point, the syntax parsing unit 130 additionally performs a process with respect to a result of chunking.

The syntax parsing module 630 takes out an agenda with the same process level and the highest priority from a global agenda, and performs the agenda.

At this point, if a type of the agenda is a chunk type, chunks in which an internal structure is determined in a process of chunk generation already have nodes. Therefore, the syntax parsing module 630 registers the already generated nodes to inactive charts (ichart) and ends the process.

Subsequently, if a type of the agenda is a clause chunk type, the syntax parsing module 630 adds virtual nodes called SBEGIN and SEND at chunk starting and end positions in order to associate with syntax parsing grammar, and then activates chunks in order to use the chunks for chunk restraints.

If a type of the agenda is other chunk types, nodes are generated through an internal parsing process in the process of syntax parsing. Therefore, the restraint and possibility processing module 650 activates chunks in order to use the chunks for chunk restraints.

Meanwhile, if a type of the agenda is an inactive chart type (Ichart Type), the syntax parsing module 630 checks whether a match rule with respect to all active charts (Achart) that can be connected to current inactive charts (ichart) is possible. In addition, firstly, if a match rule succeeded, the syntax parsing module 630 checks the restraint rule to check whether a syntax node can be generated. When the syntax parsing module 630 can generate the syntax node, a new inactive chart (New Ichart) is generated.

Further, the restraint and possibility processing module 650 uses tree possibility information, calculates a score of the new inactive chart (New Ichart), and registers the new inactive chart (New Ichart) to the Parse Table (Ptable) and the Global Agenda. At this point, in order to prevent the generation of too many intermediate nodes, the restraint and possibility processing module 650 performs a Beam Search restraint.

Meanwhile, with respect to incomplete grammar, after the syntax parsing module 630 generates a new active chart (Achart), a current inactive chart (ichart) is added to a child node or a context node. The syntax parsing module 630 finds an inactive chart (ichart) that can be coupled to the newly generated active chart (Achart) among the already processed inactive charts (ichart), and progress to the match rule process.

Further, if there are no more agendas with the same process level among the agenda registered in the global agenda, the syntax parsing module 630 checks whether the entire tree is successfully generated.

If the entire tree exists, the resultant tree selecting module 660 progresses the generation of the tree. If the entire tree does not exist, the resultant tree selecting module 660 may progress to post-processing with respect to parsing failure.

The post-progressing with respect to the parsing failure is as follows. When the generation of the entire tree is failed, the resultant tree selecting module 660 combines the entire tree using intermediate tree generated in the course of syntax parsing.

In specific, the resultant tree selecting module 660 finds the most possible partial tree among syntax nodes generated in the entire sections. Further, the resultant tree selecting module 660 sets a section of the found partial tree and repeats to find the most possible partial tree with respect to empty sections to set partial trees with respect to all sections.

Subsequently, the resultant tree selecting module 660 sets intermediate trees included in an intermediate tree list to a minimum section and uses start/end information of the intermediate trees included in the intermediate tree list to find the largest section in which a tree exists. The resultant tree selecting module 660 newly sets the found section, and repeats the process so that all the sections are filled with trees as large as possible.

Meanwhile, a syntax ambiguity resolving model using a statistical model method applied to an embodiment of the present disclosure will be described.

The syntax parsing unit 130 according to the embodiment of the present disclosure has a simple structure and uses a statistics-based syntax parsing model based on context sensitive grammar that can intuitively express a relation between constituents of a sentence. The syntax parsing unit 130 utilizes sufficient left and right context information to resolve structural ambiguity.

Before a statistics-based syntax parsing model is described, notations used in the embodiment of the present disclosure are as follows. $w_i$ refers to vocabulary information of a word, $t_i$ refers to information of a part of speech of a word, $t_i^L$ is a part of speech on the head of a left child tree of $w_i$, $t_i^R$ is a part of speech on the head of a right child tree of $w_i$.

Meanwhile, the statistical model learning unit 140 learns a statistical model from a syntax structure attachment corpus and stores a syntax parsing statistical model according to the result of learning into the syntax parsing statistical model DB 141. A syntax structure ambiguity resolving model is described as follows. In the syntax structure ambiguity resolving model, one head generates a sentence by having several dependents. For example, a word "eat" may have an object and then have a subject to generate one sentence. Further the word "eat" may have an object, have a prepositional phrase as an adverb phrase, and have a subject to generate a sentence. The model is expressed as the syntax structure ambiguity resolving model. The syntax structure ambiguity resolving model is possibility that one head basically has one dependent as a syntax relation DL. The syntax structure ambiguity resolving model expresses possibility in which one head in a certain context has a complement in another context, and the syntax structure ambiguity resolving model may be expressed as Equation 1 shown below.

$$P(w_i, t_i, t_i^L, t_i^R, DL | w_j, t_j, t_j^L, t_j^R)$$ [Equation 1]

Here, wi refers to vocabulary information of a word, ti refers to information of a part of speech of a word, tiL refers to a part of speech on a head of a left child tree of wi, and tiR refers to a part of speech on a head of a right child tree of wi.

Further, possibility in which a certain sentence S generates a sentence structure ϕ is expressed as Equation 2 shown below.

$$P(S, \phi) = \prod_{i=1}^{n} P(w_j, t_j, T_j^L, T_j^R, DL | w_i, t_i, T_i^L, T_i^R)$$ [Equation 2]

Here, P(S,ϕ) refers to possibility in which a certain sentence S generates a sentence structure ϕ. In Equation 2 shown above, T is used instead of t in Equation 1. In the case of a preposition having very little vocabulary, the vocabulary itself may be used instead of a part of speech. In the other cases, a part of speech is used. That is, t and T have the same value except in the case of a preposition. Equation 3 is expressed as below.

IF $DL == CH$ $T_i^L$(or $T_j^R$)=lex(i)(or lex(j)), if $t_i^L$(or $t_j^R$)==IN $t_i^L$(or $t_j^R$), otherwise $T_i^R$(or $T_j^L$)=$t_i^R$(or $t_j^L$)

ELSE $T_i^R$(or $T_j^L$)=lex(i)(or lex(j)), if $t_i^R$(or $t_j^L$)==IN $t_i^R$(or $t_j^L$), otherwise $T_i^L$(or $T_j^R$)=$t_i^L$(or $t_j^R$) [Equation 3]

Further, in the cases of "be", "have", and "do", parts of speech respectively referred to as "BE", "HV", and "DO" are used. In the cases of "be", "have", and "do", "D", "G", "N", and "P" are added to "BE", "HV", and "DO" respectively for a past tense, a present participle, a past participle, and a plural form.

A possibility mode applied to an embodiment of the present disclosure is calculated as Equation 4 shown below.

$$P(w_j, t_j, t_j^L, t_j^R, DL, S | w_i, t_i, t_i^L, t_i^R) = \frac{C(w_i, t_i, t_i^L, t_i^R, w_j, t_j, t_j^L, t_j^R, DL)}{C(w_i, t_i, t_i^L, t_i^R)}$$ [Equation 4]

Meanwhile, a syntax parsing method based on syntax preprocessing described above may be realized by a software program to be recorded in a certain computer-readable recording medium.

For example, the recording medium may be hard disc, a flash memory, Random Access Memory (RAM), and Read Only Memory (ROM) as internal storage of each a reproducing apparatus, or optical disc such as Compact Disc-Recordable (CD-R) and Compact Disc-ReWritable (CD-RW), a compact flash card, smart media, Memory Stick, and a multimedia card as external storage.

In this case, a program stored in a computer-readable storage medium may perform a method including a pattern chunk recognizing step of recognizing a syntax pattern predefined from a result of input part-of-speech tagging and generating at least one of a syntax tree, a section chunk, and a head-dependent relation chunk according to a type of a syntax pattern, a basic noun phrase statistical model generating step of receiving basic noun phrase (BNP) attachment corpuses as input, processing the basic noun phrase attachment corpuses into intermediate learning corpuses, and generating a basic noun phrase statistical model from the processed intermediate learning corpuses, and a basic noun phrase recognition step of using the result of part-of-speech tagging and the generated basic noun phrase statistical model and recognizing a basic noun phrase (BNP) from the input sentence, and a syntax parsing step of using at least one recognition result of the syntax tree, the syntax chunk, the head-dependent relation chunk, the basic noun phrase, the compound noun/compound word and the name entity which are recognized above, and generating a syntax tree based on a result of syntax parsing.

The functional operation and the realized product described in the specification of the present disclosure may be realized by a digital electronic circuit, realized by computer software, firmware, or hardware, or realized by a combination of at least one of these. The realized product described in the specification of the present disclosure may be realized by at least one of computer program products, in other words, at least one module relating to computer program commands encoded on a tangible program storage medium so as to control operations of a data processing apparatus or to perform execution by the data processing apparatus.

The drawings of the present disclosure illustrate operation processes, but it should not be understood that the operations are to be performed in a specific order as illustrated or all the operations as illustrated are to be performed in order to obtain a desirable result. In a certain case, multitasking or parallel processing may be advantageous.

Further, the specification of the present disclosure describes specific embodiments. The embodiments belong to the claims recited below. For example, operations recited in the claims may be performed in a different order to achieve a still desirable result The description in the above is presented as an example, and various modifications are possible without departing from the technical idea of the present disclosure by a person having ordinary skill in the art to which the present disclosure pertains. Therefore, the embodiments disclosed in the specification of the present disclosure are not intended to limit the present disclosure. The scope of the present disclosure should be interpreted by the claims recited below and all the techniques in the equivalent scope should be interpreted to be included in the scope of the present disclosure.

INDUSTRIAL APPLICABILITY

According to the present disclosure, a sentence written in a language such as English, Chinese, or Korean is input, morpheme parsing, part-of-speech tagging, and compound word recognition are performed, a rule and automata-based syntax pattern is recognized, a syntax structure is parsed by feature-based syntax parsing, and statistical information is used so that the n-best syntax structure is output. In this respect, since the present disclosure overcomes the limitation of the conventional technique, the present disclosure can be used in the related technology, an apparatus to which the present disclosure is applied is likely to be used commercially and in business, and it is clear that the present disclosure can be realized. Therefore, the present disclosure has industrial applicability.

The invention claimed is:

1. A syntax parsing apparatus based on preprocessing, the apparatus comprising a processor and a memory, wherein said processor comprising:
   a pattern chunk recognizing unit configured to
      receive a part-of-speech tagged sentence,
      recognize a pre-defined syntax pattern from the received part-of-speech tagged sentence, and
      generate, according to the recognized pre-defined syntax pattern, a recognized result comprising at least one of a first syntax tree, a section chunk, and a head-dependent relation chunk;
   a basic noun phrase recognizing unit comprising
      a basic noun phrase statistics learning module configured to
         receive basic noun phrase (BNP) attachment corpuses,
         convert, based on a predetermined grammar, the received BNP attachment corpuses into learning corpuses by tagging basic noun phrases,
         classify, using a Finite State Transducer (FST), the learning corpuses with a parenthesis and a word,
         extract features from the classified learning corpuses,
         generate a BNP statistical model from the classified learning corpuses based on the extracted features, and
         store the generated BNP statistical model into the memory, and
      a statistics-based basic noun phrase recognizing module configured to
         receive the recognized result from the pattern chunk recognizing unit and the generated BNP statistical model from the memory, and
         recognize a BNP from an input sentence using the recognized result and the generated BNP statistical model; and
   a syntax parsing unit configured to
      receive the recognized result and the recognized BNP,
      parse a syntax of the input sentence based on the recognized result and the recognized BNP, and
      generate a second syntax tree based on the parsed syntax.

2. The apparatus of claim 1, said processor further comprising:
   a statistical model learning unit configured to
      learn a statistical model from a syntax structure attachment corpus and
      store, as a syntax parsing statistical model, the learned statistical model into the memory,
   wherein the syntax parsing unit is configured to parse the syntax of the input sentence based on the recognized result, the recognized BNP, and the syntax parsing statistical model stored in the memory.

3. The apparatus of claim 1, wherein the pattern chunk recognizing unit is configured to recognize the syntax pattern expressed by at least one grammar of regular grammar, context free grammar, Augmented Context Free Grammar (Augmented CFG), and Context Sensitive Grammar (CSG).

4. The apparatus of claim 3, wherein the pre-defined syntax pattern is expressed by at least one of
   a series of words or a pattern of part-of-speech listing with the regular grammar,
   patterns calculated by a node feature value with the context free grammar or the Augmented CFG, and
   a left and a right context of the first syntax tree and a syntax pattern with the CSG.

5. The apparatus of claim 1, wherein the pre-defined syntax pattern is expressed, according to a syntax rule writing principle, with at least one of
   a section dividing recognized syntax patterns according to a syntax pattern type or a syntax chunk type,
   a definition (define) statement expressing and simplifying a complicated node,
   a virtual node tag (virtual tag) parameterizing a part of tags,
   a subcategory (subcat) defining a vocabulary category, and
   a rule including patterns and actions.

6. The apparatus of claim 1, wherein the pattern chunk recognizing unit comprises:
   a rule loading module configured to
      read a syntax pattern dictionary file and
      store the syntax pattern dictionary file into a storage structure appropriate for a rule;
   a workspace generating module configured to generate a workspace including at least one of an active chart (achart), agenda, a first inactive chart (ichart), inactive agenda (igenda), a set of terminal nodes, a set of non-terminal nodes, and a result of parsing; and
   a parsing module configured to parse the received part-of-speech tagged sentence by applying syntax pattern dictionary of the syntax pattern dictionary file to the received part-of-speech tagged sentence.

7. The apparatus of claim 6, wherein the parsing module is configured to
   generate, when the rule is complete, a second ichart using tree generation information, and
   generate, when the rule is incomplete, the achart having an increased index indicating an identical position in the recognized pre-defined syntax pattern.

8. The apparatus of claim 1, wherein the syntax parsing unit is configured to minimize a syntax parsing error caused by error propagation in a part-of-speech tagging step using a result of 1-best path part-of-speech tagging or n-best part-of-speech tagging.

9. The apparatus of claim 1, wherein the syntax parsing unit is configured to remove syntax ambiguity using a statistical model based on Context Sensitive Grammar (CSG) when the syntax parsing unit parsed syntax parsing pre-processing and a result of n-best part-of-speech tagging.

10. A syntax parsing method based on syntax pre-processing, the method performed by a syntax parsing apparatus comprising a processor and a memory, the method comprising:
   receiving a part-of-speech tagged sentence;
   recognizing a pre-defined syntax pattern from the received part-of-speech tagged sentence;
   generating a recognized result comprising at least one of a first syntax tree, a section chunk, and a head-dependent relation chunk according to the recognized syntax pattern;
   receiving basic noun phrase (BNP) attachment corpuses,
   converting, based on a predetermined grammar, the received BNP attachment corpus into learning corpuses by tagging basic noun phrases;
   classifying, using a Finite State Transducer (FST), the learning corpuses with a parenthesis and a word;

extracting features from the classified learning corpuses;
generating a BNP statistical model from the classified learning corpuses based on the extracted features;
storing the generated BNP statistical model into the memory;
recognizing a BNP from an input sentence using the recognized result and the generated BNP statistical model stored in the memory;
parsing a syntax of the input sentence based on the recognized result and the recognized BNP; and
generating a second syntax tree based on the parsed syntax.

11. The method of claim 10, further comprising:
learning a statistical model from a syntax structure attachment corpus; and
storing, as a syntax parsing statistical model, the learned statistical model into the memory,
wherein the processor is configured to parse the syntax of the input sentence based on the recognized result, the recognized BNP, and the syntax parsing statistical model stored in the memory.

12. The method of claim 10, wherein the pre-defined syntax pattern is expressed by at least one of
a series of words or a pattern of part-of-speech listing with regular grammar,
patterns calculated by a node feature value with context free grammar or augmented context free grammar, and
a left and a right context of the first syntax tree and a syntax pattern with context sensitive grammar.

13. The method of claim 10, wherein the pre-defined syntax pattern is expressed, according to a syntax rule writing principle, with at least one of
a section dividing recognized pre-defined syntax patterns according to a syntax pattern type or a syntax chunk type,
a definition (define) statement expressing and simplifying a complicated node,
a virtual node tag (virtual tag) parameterizing a part of tags,
a subcategory (subcat) defining a vocabulary category, and
a rule including patterns and actions.

14. The method of claim 10, wherein the generating a recognized result comprises:
reading a syntax pattern dictionary file and storing the syntax pattern dictionary file into a storage structure appropriate for a rule;
generating a workspace including at least one of an active chart (achart), agenda, a first inactive chart (ichart), inactive agenda (igenda), a set of terminal nodes, a set of non-terminal nodes, and a result of parsing;
applying syntax pattern dictionary of the syntax pattern dictionary file to the received part-of-speech tagged sentence; and
parsing the received part-of-speech tagged sentence.

15. The method of claim 14, wherein the parsing the received part-of-speech tagged sentence comprises:
generating, when the rule is complete, a second ichart by using tree generation information;
generating, when the rule is incomplete, the achart having an increased index indicating an identical position in the recognized pre-defined syntax pattern.

16. A non-transitory computer-readable recording medium recording a computer program for causing a computer comprising a processor and a memory to execute a method for syntax parsing, the method comprising:
receiving a part-of-speech tagged sentence;
recognizing a pre-defined syntax pattern from the received part-of-speech tagged sentence;
generating a recognized result comprising at least one of a first syntax tree, a section chunk, and a head-dependent relation chunk according to the recognized syntax pattern;
receiving basic noun phrase (BNP) attachment corpuses,
converting, based on a predetermined grammar, the received BNP attachment corpuses into intermediate learning corpuses by tagging basic noun phrases;
classifying, using a Finite State Transducer (FST), the learning corpuses with a parenthesis and a word;
extracting features from the classified learning corpuses;
generating a BNP statistical model from the classified learning corpuses based on the extracted features;
storing the generated BNP statistical model into the memory;
recognizing a BNP from an input sentence by using the recognized result and the generated BNP statistical model stored in the memory;
parsing a syntax of the input sentence based on the recognized result and the recognized BNP; and
generating a second syntax tree based on the parsed syntax.

* * * * *